Aug. 23, 1966  A. HOHMANN  3,268,162
DATA SOURCE RECORDER
Filed Dec. 30, 1963  11 Sheets-Sheet 3

INVENTOR.
ALBERT HOHMANN
BY James H. Conner
AGENT.

Aug. 23, 1966  A. HOHMANN  3,268,162
DATA SOURCE RECORDER

Filed Dec. 30, 1963  11 Sheets-Sheet 4

INVENTOR.
ALBERT HOHMANN

BY James H. Conner

AGENT.

INVENTOR.
ALBERT HOHMANN
BY James H. Conner
AGENT.

INVENTOR.
ALBERT HOHMANN
BY James H. Conner
AGENT.

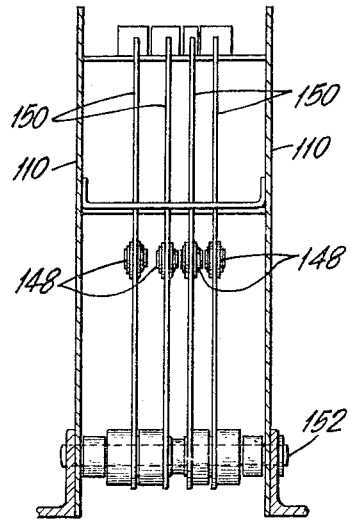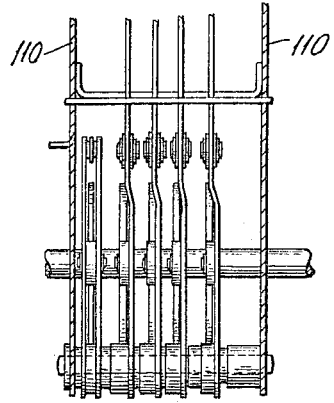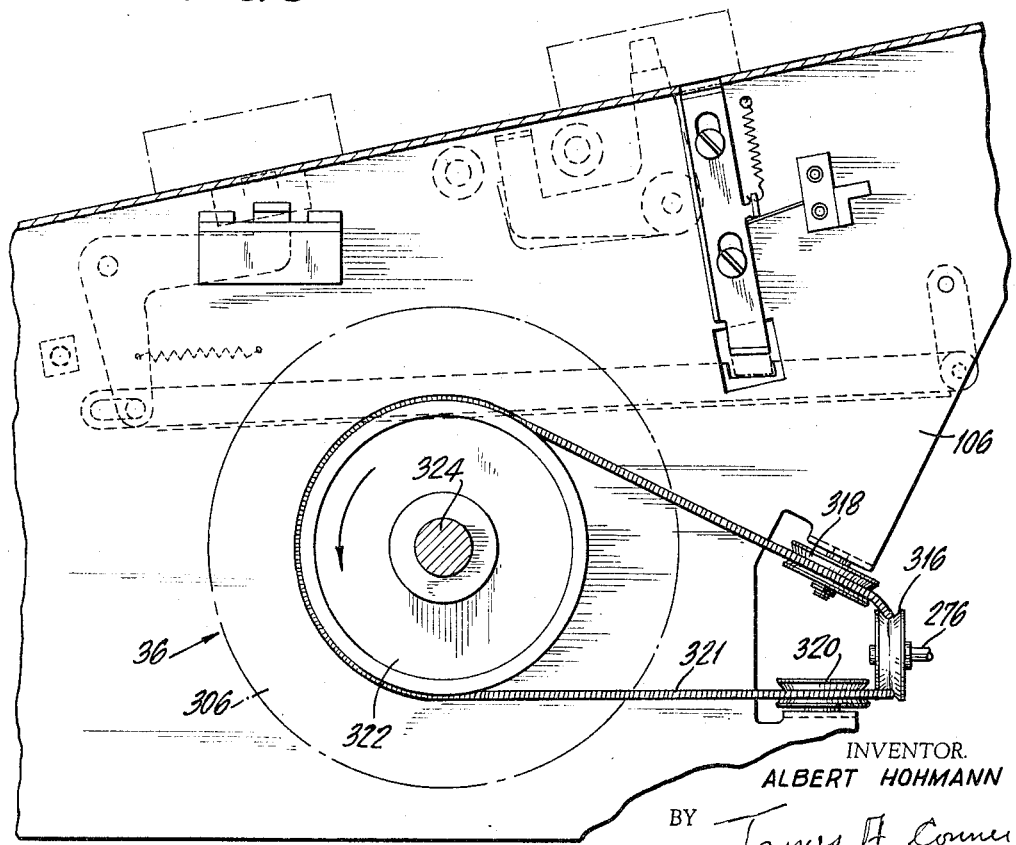

Aug. 23, 1966         A. HOHMANN         3,268,162
                   DATA SOURCE RECORDER
Filed Dec. 30, 1963                    11 Sheets-Sheet 9
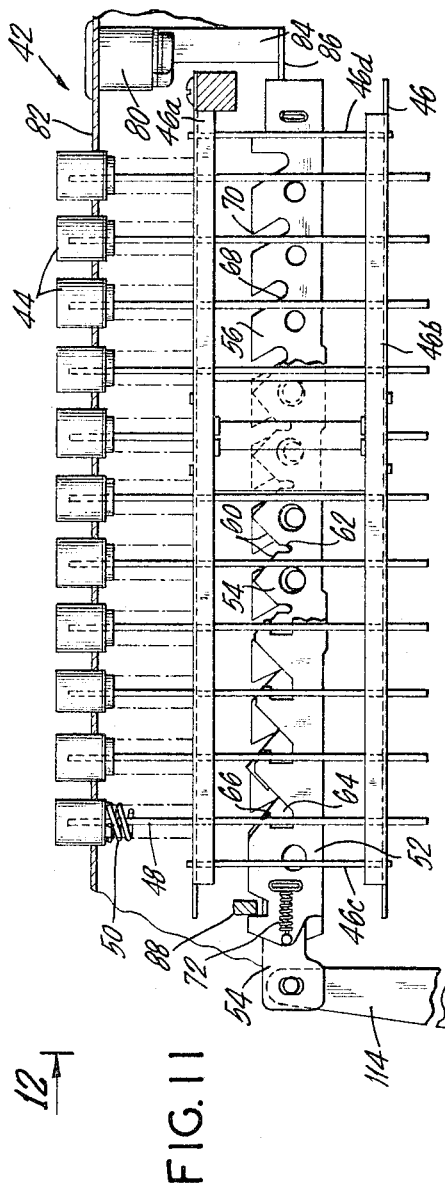
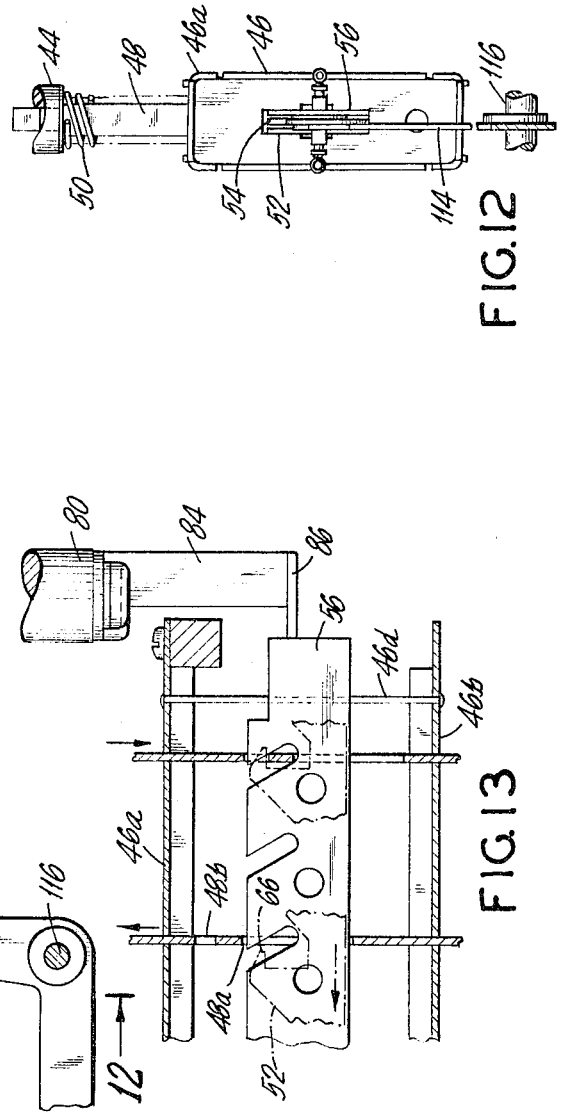
INVENTOR.
ALBERT HOHMANN
BY James H. Conner
AGENT.

Aug. 23, 1966  A. HOHMANN  3,268,162
DATA SOURCE RECORDER
Filed Dec. 30, 1963  11 Sheets-Sheet 10

INVENTOR.
ALBERT HOHMANN
BY James A. Conner
AGENT.

Aug. 23, 1966    A. HOHMANN    3,268,162
DATA SOURCE RECORDER
Filed Dec. 30, 1963    11 Sheets-Sheet 11

INVENTOR.
ALBERT HOHMANN
BY James H. Conner
AGENT.

3,268,162
DATA SOURCE RECORDER
Albert Hohmann, Brooklyn, N.Y., assignor to Taller & Cooper, Inc., Brooklyn, N.Y., a corporation of New York
Filed Dec. 30, 1963, Ser. No. 334,350
8 Claims. (Cl. 234—32)

This invention relates generally to business machines and in particular to a keyboard operated data source recorder having a printed and perforated tape output.

The invention is directed toward providing means for accumulating data in a common language 5, 6, 7, or 8 channel perforated tape at a remote source in an off line operation. The tapes from a plurality of locations are transmitted by conventional means to a central headquarters, spliced one to the other with special remote location identification, optically scanned and converted into magnetic tape carried information. The magnetic tape is then utilized as the input means for a conventional computer.

The present machine has been designed for use with the recording of individual transactions of the type wherein a pre-punched or pre-printed ticket is the source of information. Such tickets are used by the garment industry for their inventory and accounting operations. As is well known, multiple type tickets having codal information are attached to each garment and when sold at retail level, a portion of the ticket is removed and returned to the accounting headquarters where the ticket record is utilized for many statistical and accounting purposes. For example, the code number on the ticket will indicate the type of garment, the price, coloring, etc., and can be used for re-ordering, etc. Heretofore, such tickets were accumulated at remote locations and forwarded to central headquarters where they were subsequently reproduced by manual keypunch operators into the form of a conventional tabulating card. The tabulating machine cards then provided the input source to the computer. Obviously, the manual transcription of the garment ticket information into the punched tabulating card introduced a potential source of error and in addition consumed a considerable amount of time and effort. The present machine being located at the source of the sale, permits the manual entry of the garment ticket information by manually depressible keys and directly controls a tape punch which perforates the paper tape. The printed data on the garment ticket is predetermined to provide a check digit for a modulo 9 check system. Obviously, other modulo check systems can be utilized without departing from the scope of the present invention. The use of the modulo 9 check system in the present machine eliminates the potential entry of incorrect data and therefore erroneous perforations in the tape. This is made possible by utilizing a novel type punch which, contrary to conventional tape punches, requires the initial set-up of a plurality of character punches and then, after a complete set-up and a verification by the modulo 9 checking mechanism, the tape punch is actuated to gang punch the plurality of characters in a single punching operation.

Accordingly, one of the principal objects of the present invention resides in the provision of a keyboard entry tape punch having a modulo digit check system integrally controlling the tape punch in accordance with the correctness of the manual entry.

Another object of the invention is to provide a mechanical keyboard which mechanically controls, through mechanical interponents, a plurality of codally perforated tape punches.

A further object of the invention is to provide a printed copy in digital form of the data perforated in the tape as an automatic by-product of the tape punching mechanism.

Yet another object is to provide a novel type tape transport system having the usual safety features to indicate broken tapes or low tape supply, etc., and further including a novel tape motion detector.

Other ancillary objects will be, in part, hereinafter pointed out and will be in part hereinafter apparent.

Figure 7:
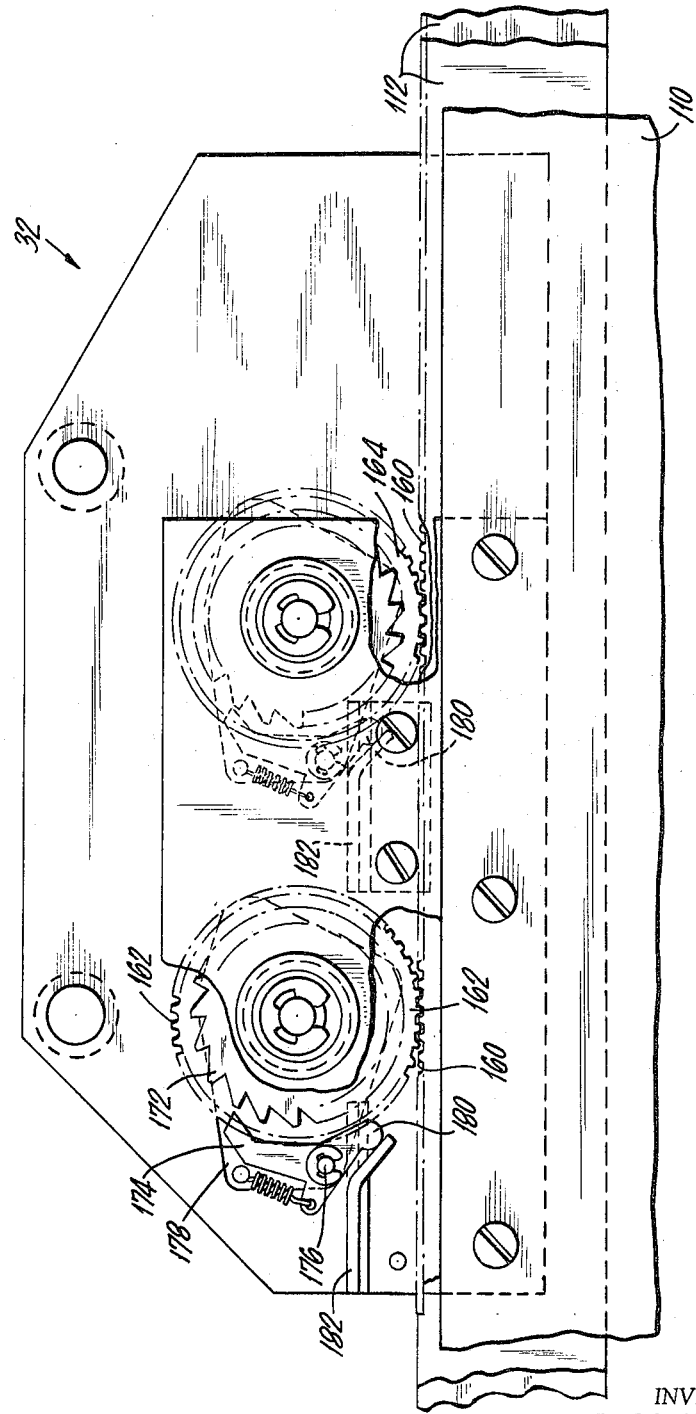

FIGURE 7 has an enlarged side elevation of the modulo 9 mechanism with portions cut away to more clearly illustrate the gear transfer.

Figure 2:
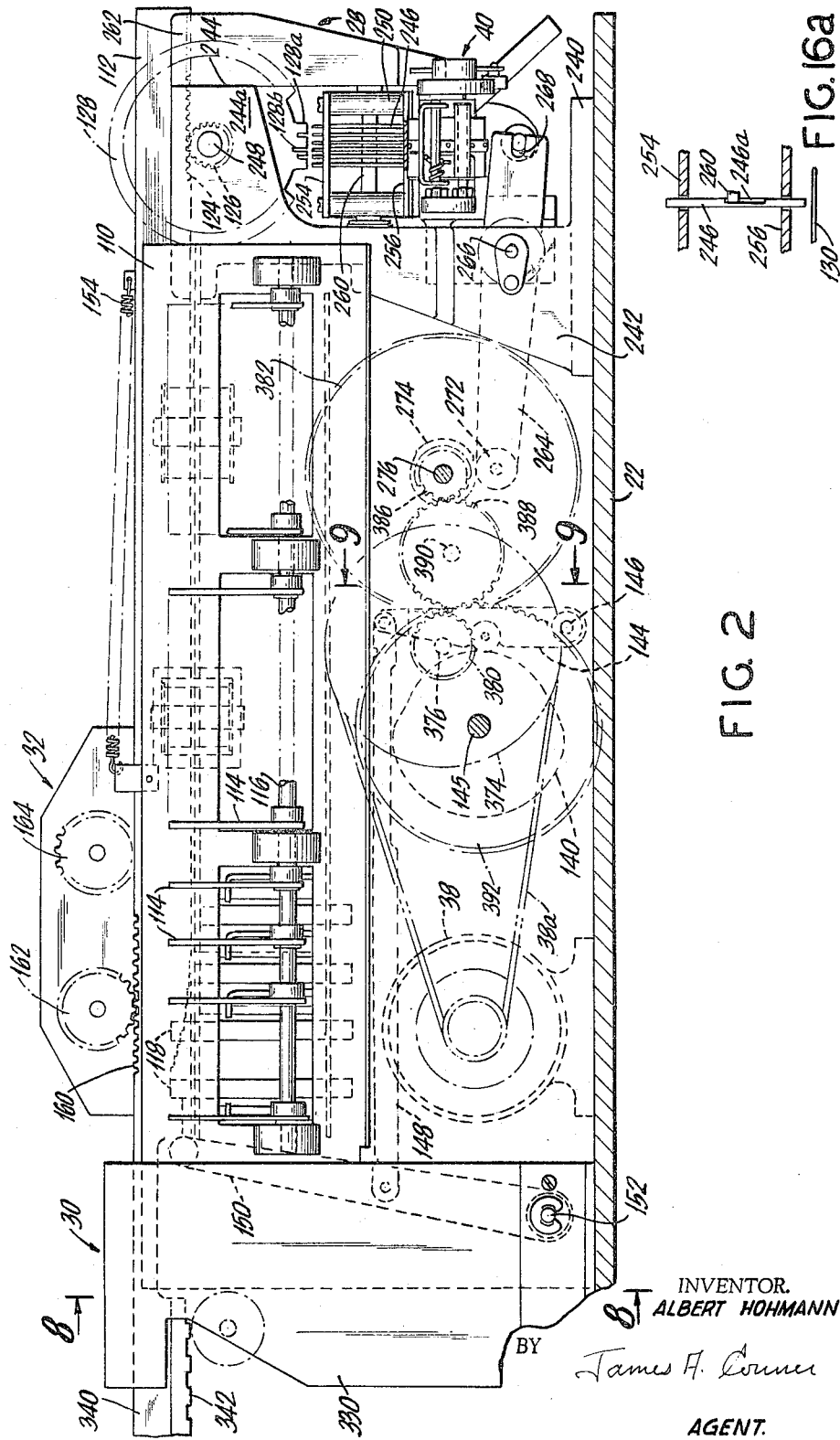
FIGURE 2 is a cross section taken along line 2—2 of FIGURE 1.

FIGURE 8 is a cross section taken along line 8—8 of FIGURE 2.

FIGURE 9 is a cross section taken along line 9—9 of FIGURE 2.

FIGURE 10 is an enlarged side view detailing the tape rewind drive mechanism.

FIGURE 11 is a sectioned detail of a single keybank illustrating the mechanical progression of the actuating bar.

FIGURE 12 is a cross section taken along line 12—12 of FIGURE 11.

FIGURE 13 is an enlarged detail of the cooperating action of a button slide with the actuating bar.

Figure 14:
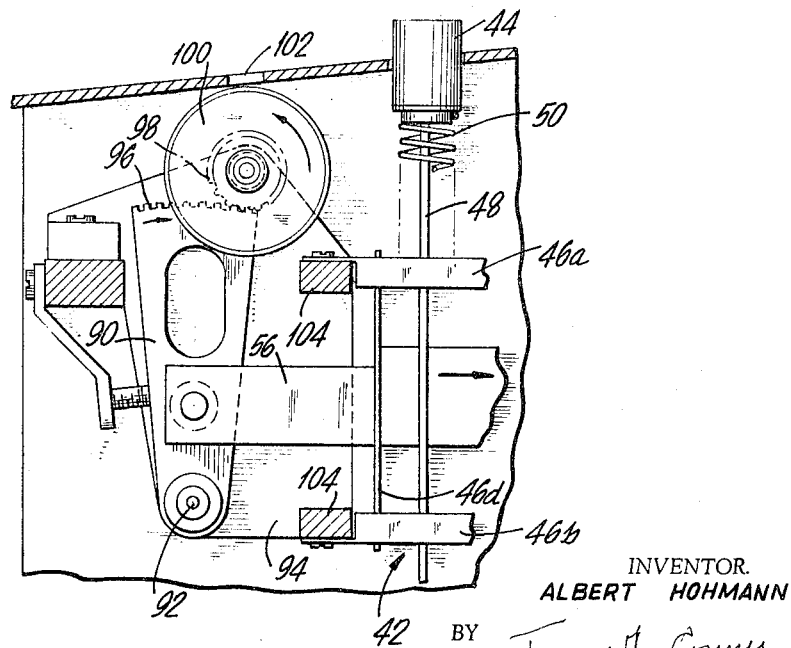

FIGURE 14 is an enlarged detail in side elevation of the key bank indication actuating mechanism.

Figure 15:
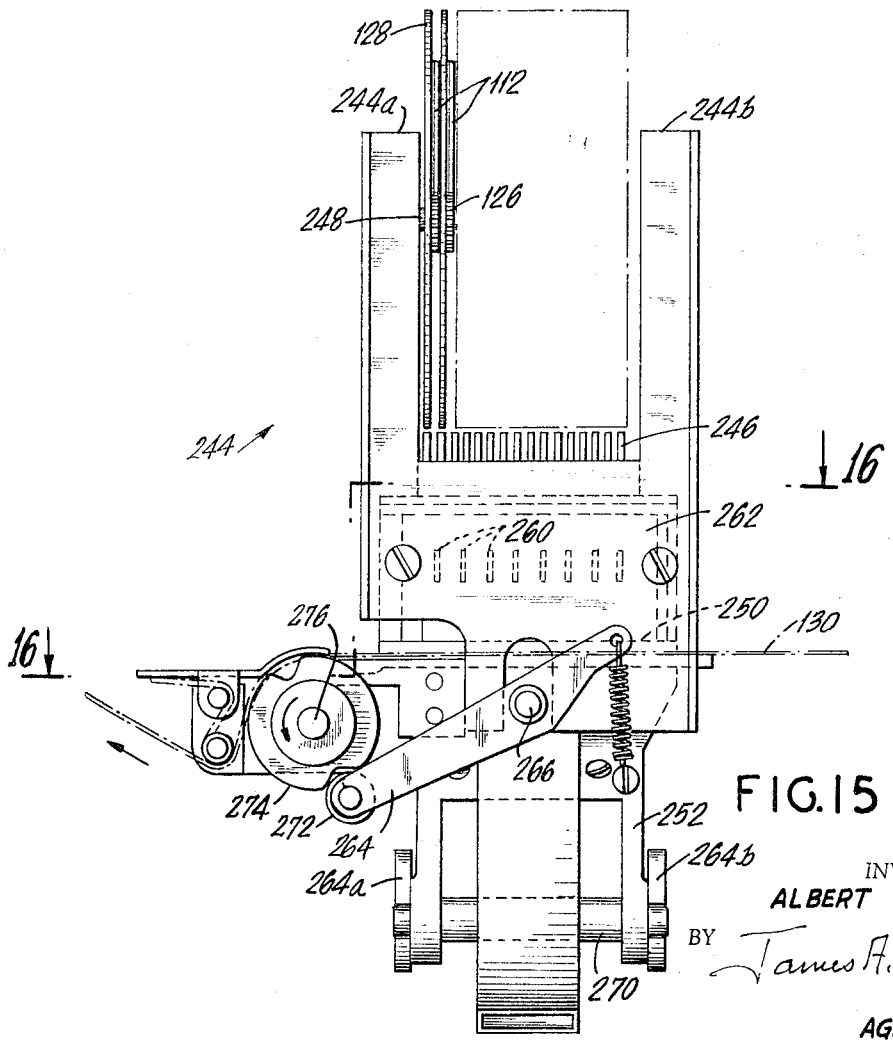

FIGURE 15 is a side elevation of the tape punch.

Figure 16:
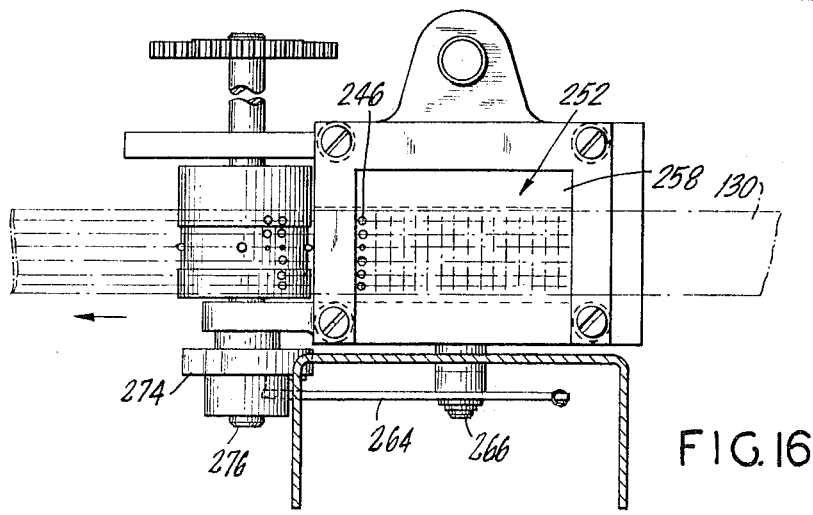

FIGURE 16 is a cross section taken along line 16—16 of FIGURE 15.

Figure 1:
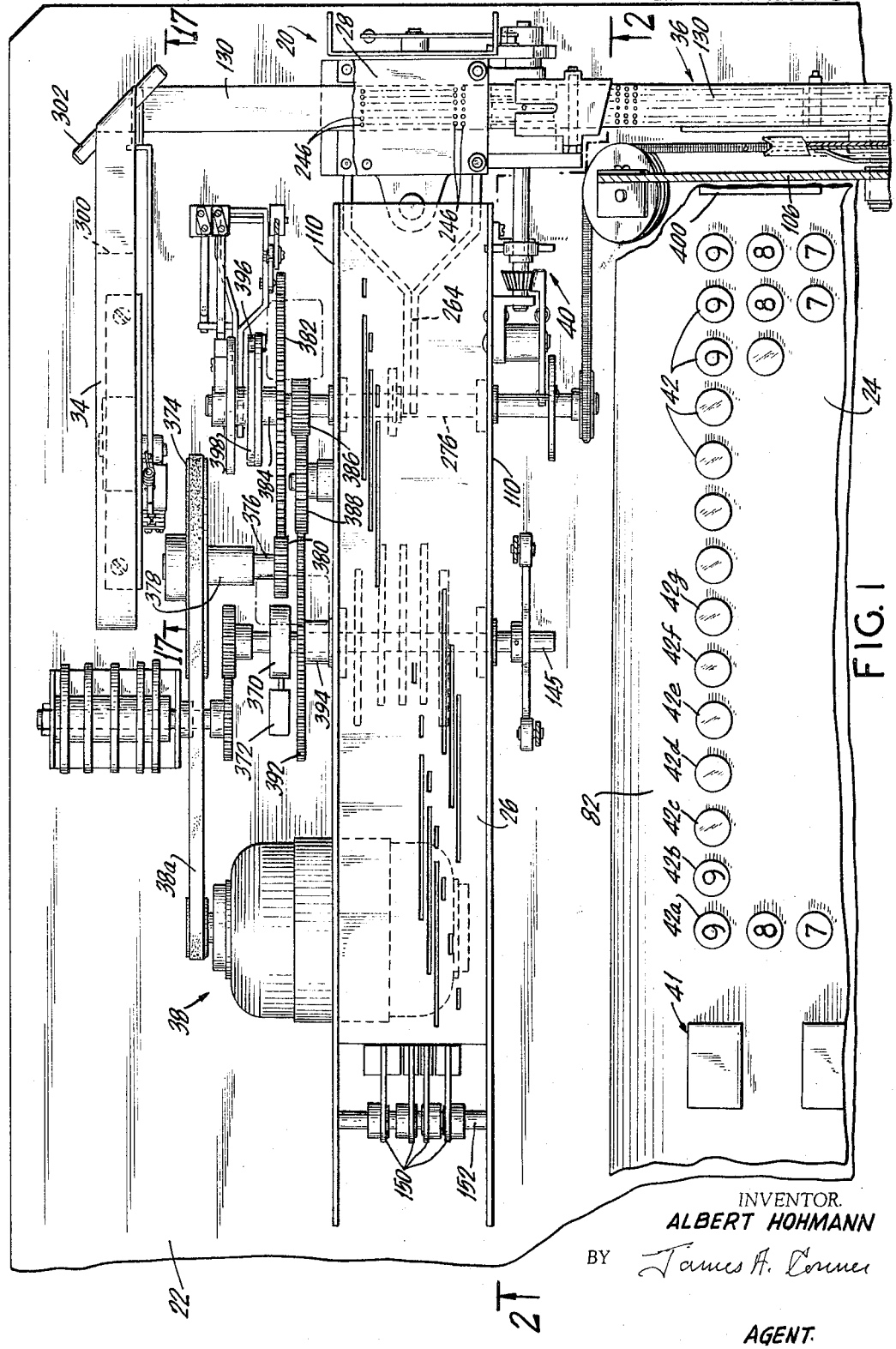
FIGURE 1 is a plan elevation of the gear train and drive mechanism of the present machine.

FIGURE 17 is a cross section taken along line 17—17 of FIGURE 1.

Figure 18:
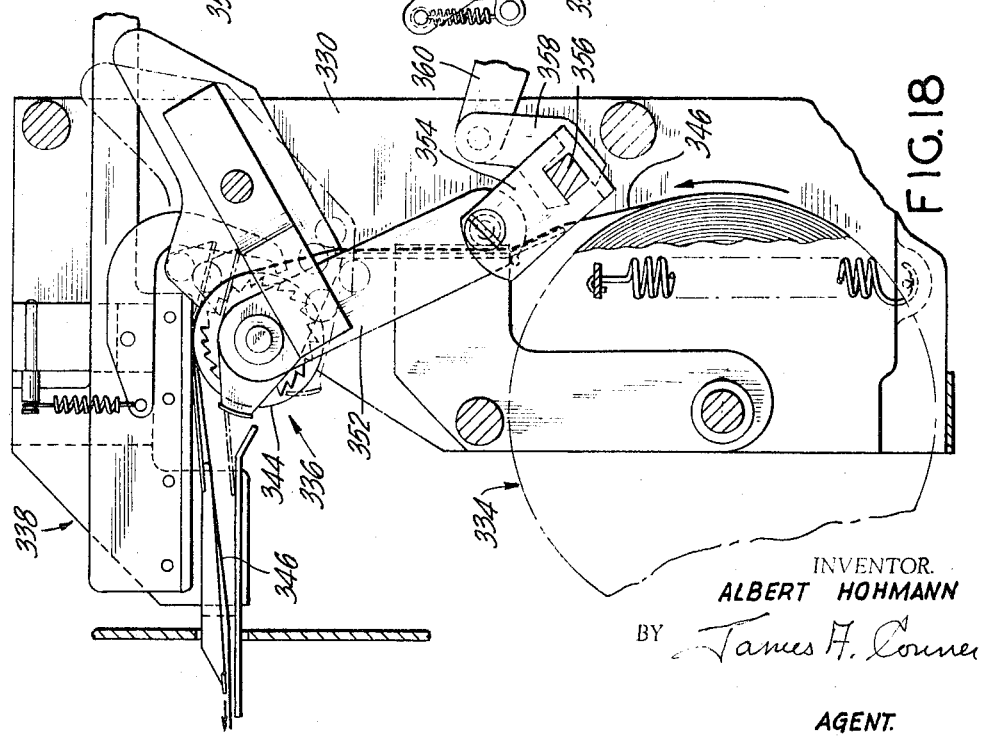

FIGURE 18 is a side elevation of the printing and print record paper advancing mechanism.

Figure 19:
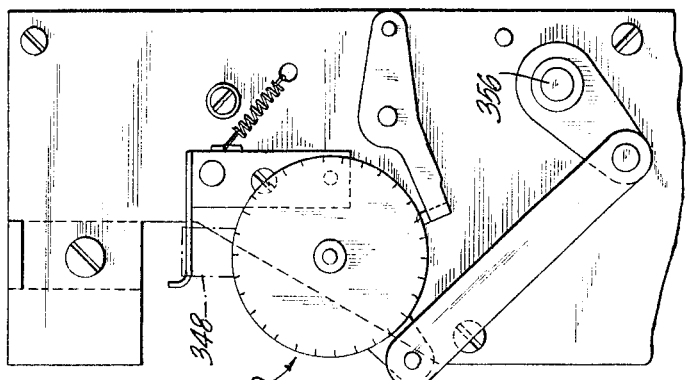

FIGURE 19 is a side elevation of the print ribbon-reverse mechanism.

Figure 20:
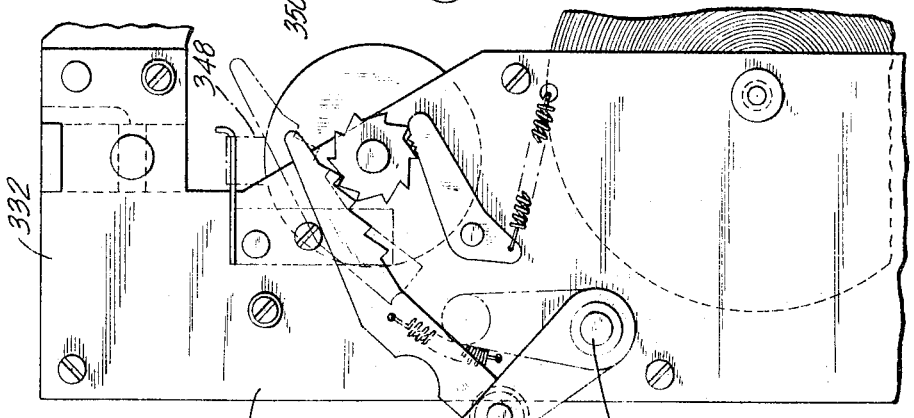

FIGURE 20 is a side elevation of the ribbon-reverse actuating mechanism.

Referring to the drawings in detail, 20 generally designates the source recorder having a base 22 and mounted thereon plural components that cooperate to provide an integrated punched tape record. The major components are: the keyboard 24; the decoding rack assembly 26; the tape punch 28; the printer 30; the modulo nine check mechanism 32; the tape supply 34 and the tape storage 36. Supplementing the major components are the motor drive 38 and a tape feed mechanism 40. Tape feed mechanism 40 is completely described and illustrated in applicant's co-pending application, Serial Number 285,773, filed June 5, 1963, entitled "Punched Tape Feed."

The keyboard 24 comprises a plurality of keybanks 42, FIGURE 11, each having eleven keys 44 mounted in a frame 46 in aligned relation. The keys 44 are individually depressible to move a related key stem bar 48 downwardly against the spring 50 disposed circumjacently on bar 48 and intermediate the upper frame member 46a to compress said spring 50. Disposed longitudinally in the frame 46 and supported in slidable relation in the respective end frame pieces 46c and 46d are three individually movable racks 52, 54, and 56. The racks 52, 54, and 56 are disposed to pass through an aperture 48a in each key stem bar 48 and are co-operable with the respective key stem bars to control the racks 52, 54, and 56 in a predetermined manner to advance rack 54 longitudinally in predetermined increments in accordance with the particular key 44 that is depressed.

Rack 54 is the progression rack that is provided with a series of discretely disposed angularly tapered recesses 60 that each terminate in a slot 62. The depression of a single key stem bar 48 engages the portion of the stem above the aperture 48a with the tapered recess 60 of progression rack 54 and moves said rack longitudinally until the stem enters slot 62. A second key 44 cannot be depressed while the previous stem is in the related slot 62 since the slots 62 are not equidistantly spaced relative to the spacing of the key stems 48.

Rack 54, the progression rack, is moved to the right in FIGURE 11, incrementally with the depression of the respective keys 44; i.e., the depression of the key 44 on the left of the view, key number 9, will move the rack 54 ten increments rightwardly. Depression of the adjacent key, the 8 key, will move the rack 54 nine increments, and depression of the next key, the 7 key, will move the rack 54 eight increments. The keys numbered 6, 5, 4, 3, 2, 1, and zero similarly move the rack 54 in related increments. It will be noted that depression of the zero (0) key moves the rack a single increment for reasons hereinafter appearing.

Racks 52 and 56 combine to respectively hold a depressed key down in depressed position and lock out or prevent a second key from being depressed while any key is held down. Rack 52 is provided with recesses 64 equidistantly spaced along the upper margin of said rack. Each recess 64 is provided with an angularly extending projection 66 that is adapted to enter the aperture 48b in each stem 48 and prevent upward movement of the stem when said stem is fully depressed.

Rack 56 is provided with a series of equidistantly spaced angular recesses 68 that are provided with a projected portion 70. When a stem is depressed, the projection 70 of the slot 68 related to the depressed key stem resides within the aperture 48b. All other projections 70 reside in the apertures 48a of the remaining key stems 48 and prevent their depression while any one key stem is in held down depressed relation.

Rack 56 is urged rightwardly, FIGURE 11, by a spring 72 while rack 52 is urged leftwardly, FIGURE 11, by spring means, not shown.

The key bank 42 may be provided with a conventional key-operated lock 80 affixed to the keyboard cover plate 82. The rotatable latch portion 84 is provided with an arm 86 that is adapted to abut against rack 56 when disposed in locked position to prevent movement of rack 56 leftwardly, FIGURES 11 and 13, and therefore prevent depression of any numbered key in the key bank.

It will be noted that the right hand key 44, FIGURE 11, is a release key which, when depressed, actuates racks 52 and 56 to release any depressed number (0 to 9) keys. Similarly, a bail 88 is provided to simultaneously release all depressed keys in the key banks comprising keyboard 24. The operation of bail 88 will be described hereinafter.

Referring to FIGURE 14, there is shown a visual indicator associated with each key bank 42 which visually displays the number of the key depressed in the key bank. The keys are successively numbered zero through nine (0, 1, 2, 3, 4, 5, 6, 7, 8, 9) and, as aforementioned depression of a key moves the progression rack 54 a predetermined distance. Simultaneously, a sector 90, pivotally mounted on a stud 92 affixed to a frame 94 which is secured to the key bank 42, rotates around stud 92. Sector 90 is pivotally affixed to progression rack 56 and moves therewith. Sector 90 is provided with teeth 96 which engage a pinion 98 co-axial with and secured to indicator wheel 100. Indicia, not shown, on indicator wheel 100 displays the relative numerical value of the key depressed in key bank 42 through a window 102 provided in keyboard cover plate 82.

It will be noted that the lock 80 is only utilized on a specific key bank designated as 41 and when so used, the visual indicator is omitted from the key bank.

Each key bank 42 is a separate removable unit and in the present source recorder fourteen key banks 42 are commonly mounted on support bars 104 which are in turn affixed to side frame plates 106, one of which is shown in FIGURE 1. The other side plate 106, not shown, is disposed at the other side of the keyboard 24.

Keybank 41 is of similar construction to keybanks 42. However, the keys differ in shape and number, as will be hereinafter apparent.

Figure 3:
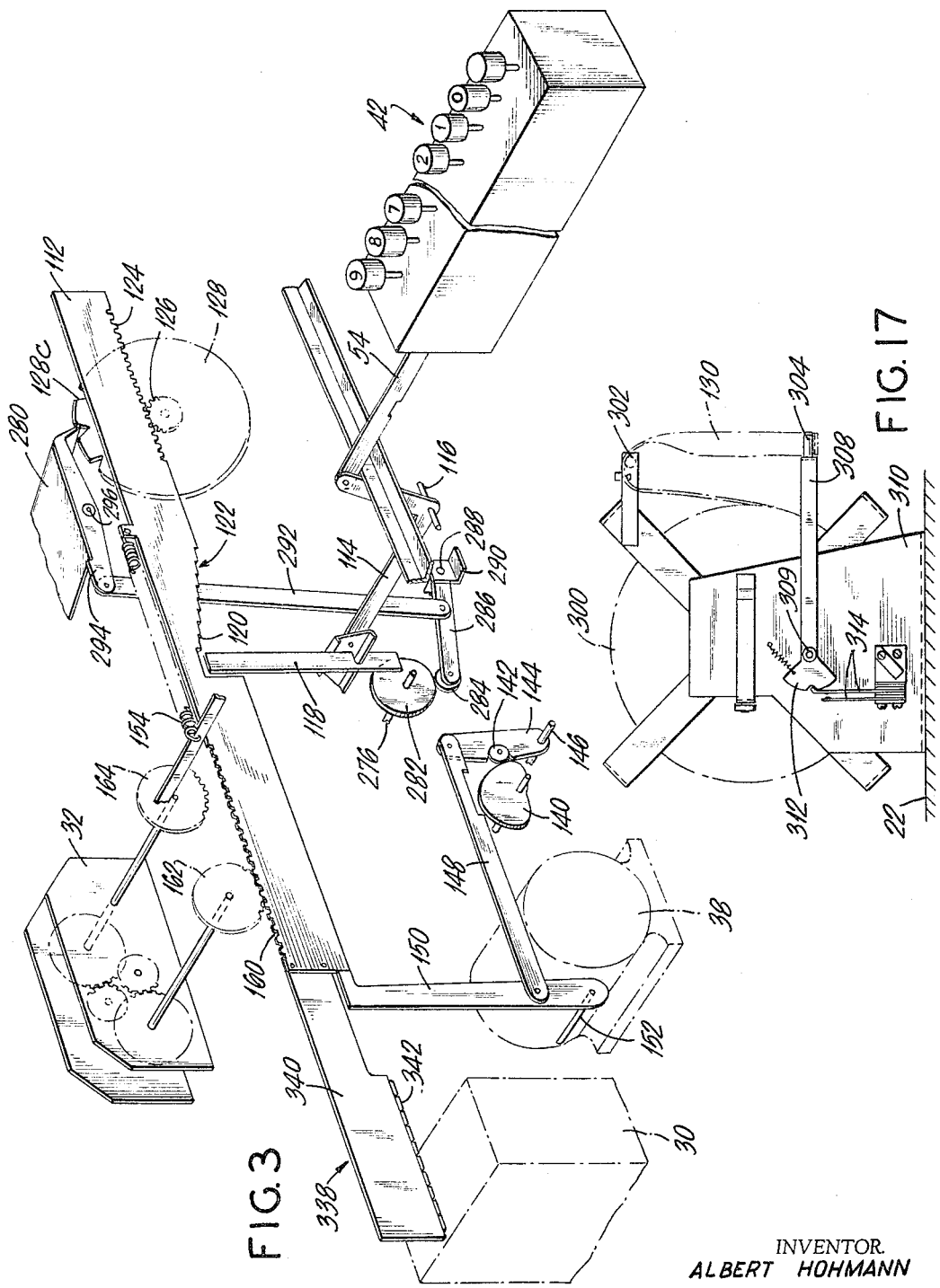
FIGURE 3 is an exploded isometric projection of the control mechanism and the associate relationship of modulo 9 input.

The decoding rack assembly 26 comprises a pair of spaced frames 110 secured to base 22 and having a plurality of serrated racks 112 slidably mounted thereon. Assembly 26 is disposed adjacent to the upper margin of keyboard 24 and key banks 42 therein are adapted to co-operate with the racks 112 as hereinafter described. Sixteen racks 112 are provided for reasons hereinafter appearing, fourteen of which are associated with the fourteen key banks 42 in keyboard 24. Referring to FIGURE 3, a keybank 42 is illustrated having the progression rack 54 extending therefrom. Progression rack 54 is pivotally secure to a bell crank 114 which pivots on a shaft 116. While not shown, it will be understood that bell cranks 114, associated with all key banks 42, pivot on shaft 116 in the same manner illustrated. Bell crank 114 is secured to a vertical movable rack sensing bar 118. Sensing bars 118 are slidably secured in means not shown to permit vertical motion of the bars only. In accordance with the incremental movement of progression rack 54, bell crank 114 will rotate a related degree and raise sensing bar 118 a similarly related distance. The sensing bar 118 enters a recess 120 formed in the underside of a rack 112. The recess 120 is formed with ten steps designated as 122 and when the rack 112 is moved leftwardly by means hereinafter described one of the steps 122 will engage the sensing bar 118 and arrest the leftward movement of the rack 112.

Thus, the numerical value of the depressed key in keybank 42 controls the relative numerical position of rack 112. It will be noted that serrations 124 formed in the underside of rack 112 are disposed in meshing engagement with pinions 126 which are co-axially secured to code wheels 128. Code wheels 128 hereinafter described control the punches in tape punch 28 to punch the codal equivalent of the depressed key in key bank 42 in paper tape 130. This procedure will be described hereinafter under the heading of "Operation."

A special key bank 41 similar in structure to keybanks 42 is provided to control a code wheel 128 to introduce particular message identification in the paper tape 130. Keybank 41 is provided with a progression rack 54 and controls a rack 112 in the same manner as hereinbefore described.

The operations of racks 112 with respect to the code wheels 128 are similar, as will be hereinafter apparent.

Motor drive 38, as hereinafter described, controls a cam 140 to rotate. Follower 142 attached to arm 144 pivoted on shaft 146 pivots arm 144 with each rotation. A link 148 pivotally attached to arm 144 connects to a reset lever 150 which pivots on a shaft 152. Lever 150 abuts against a stop or rack 112 and prevents spring 154 from urging rack 112 leftwardly. As will be hereinafter described, lever 150 when pivoted away from the rack permits spring 154 to move rack 112 leftwardly to position code wheel 128 in codal relationship with the punches in tape punch 28.

Figure 4:
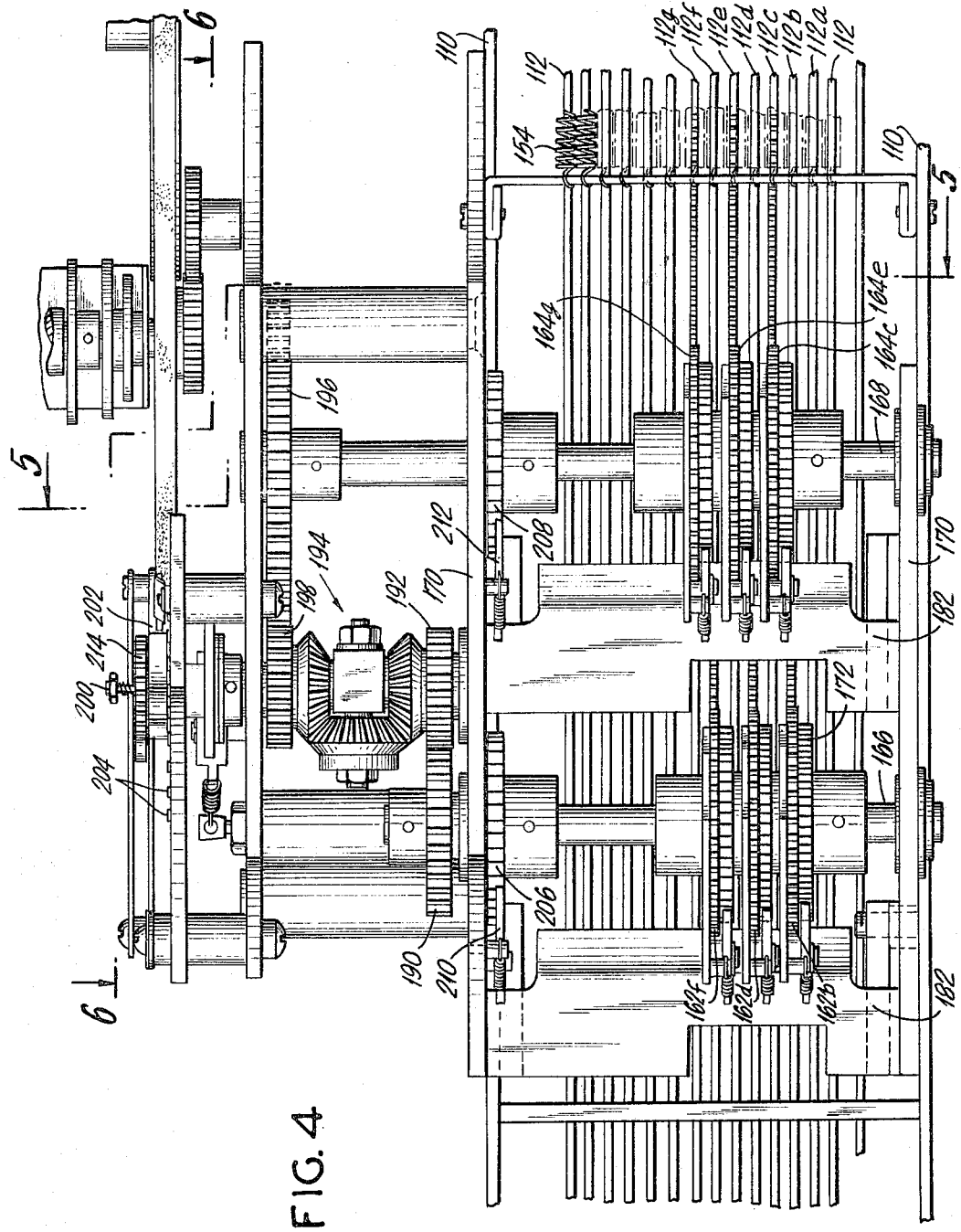
FIGURE 4 is a plan elevation of the modulo 9 mechanism.

Certain of the racks 112 are provided with serrations 160 which mesh with pinions 162 and 164 of the modulo nine mechanism 32. To simplify the description of the modulo nine mechanism 32, the first seven numerical keybanks have been designated 42a, 42b, 42c, 42d, 42e, 42f, and 42g (FIGURE 1). Keybank 42a controls code rack 112a; keybank 42b controls code rack 112b and keybanks 42c through 42g control the respective code racks 112c through 112g (FIGURE 4).

The pinions 162 of which there are three in number are designated as 162b, 162d, and 162f, respectively. Pinion 162b meshes with the serrations 160 on code rack 112b. Pinion 162d meshes with the serrations 160 on code rack 112d and pinion 162f meshes with serrations 160 on code rack 112f. Pinion 164 of which there are three in number are designated as 164c, 164e, and 164g, respectively. Pinion 164c meshes with serrations 160 on code rack 112c. Pinion 164e meshes with serrations 160 on code rack 112e and pinion 164g meshes with serrations 160 on code rack 112g.

Pinions 162b, 162d, and 162f are journaled on shaft 166 and pinions 164c, 164e, and 164g are journaled on shaft 168. Shafts 166 and 168 are journaled in suitable bearings mounted in a pair of spaced frames 170 which are secured to the code rack assembly frame plates 110.

Each of the pinions 162b, 162d, and 162f are coupled to shaft 166 by means of a ratchet wheel 172 affixed to shaft 166. A pawl 174 pivotally mounted on a stud 176 extending from a plate 178 secured to each pinion 162b, 162d, and 162f is spring urged into engagement with the ratchet wheel 172. With the racks 112 disposed in normal position (FIGURE 7), i.e.; the position assumed at the end of a punching cycle in preparation for the succeeding punching cycle, arms 180 of pawls 174 are disposed in engagement with fixed plates 182 and the pawls 174 are held out of engagement with ratchet wheels 172. The leftward movement of racks 112 by springs 154 when levers 150 are pivoted away from engagement with the racks 112 rotates the pinions 162 and 164 which in turn rotates plates 178 clockwise. The clockwise rotation of plates 178 disengages the arms 180 of pawls 174 from fixed plate 182 and permits the pawls to engage the respective ratchet wheels and turn the ratchet wheels incrementally in accordance with the movement of the rack 112.

Rotation of the ratchets 172 similarly rotate the respective shafts 166 and 168 in related increments.

Shaft 166 has affixed thereon a pinion 190 which meshes with an input pinion 192 of differential 194. Shaft 168 has affixed thereon a pinion 196 which meshes with the other input pinion 198 of differential 194. The output shaft 200 of differential 194 (FIGURE 6) has secured thereon an electrical wiper 202 for purposes hereinafter described.

It will be noted that shaft 166 rotates pinions 190 and 192 in a one to one ratio and the differential output shaft 200 rotates accordingly. Shaft 168 however rotates pinions 196 and 198 in a one to two ratio. Output shaft 200 rotates in accordance with the input increments of shaft 168.

Differential mechanisms are well known to those skilled in the art and need not be described in detail herein. The one to one ratio differential 194 accumulates the single increments of shaft 166 and the doubled increments of shaft 168 rotate wiper 202 to a position on one of the contacts 204 associated with the wiper 202.

It will be noted that the pawls 174 with arms 180 engaging the fixed plates 182 are sufficiently disengaged from ratchet wheels 172 to require one increment of movement before releasing to engage the ratchet wheels 172. The one increment of movement of racks 112 and one increment of rotation of pinions 162 and 164 occurs when the zero key in a related key bank 42 is depressed. As will be hereinafter described, the modulo nine mechanism 32 does not accumulate zero counts and accordingly zero keys are not entered therein.

Means are provided to permit rotation of shafts 166, 168 in one direction only and directed toward this end are a pair of ratchets 206 and 208 affixed to the respective shafts 166 and 168. Pawls 210 and 212 cooperate to permit uni-directional rotation of the respective shafts 166 and 168.

Briefly, racks 112b and 112c are permitted to move under power from their respective springs 154 when the lever 150 is released. Other levers 150 retain racks 112d, 112c, 112f, and 112g in stationary position while racks 112b and 112c move leftwardly (FIGURE 4). Thus, shafts 166 and 168 individually rotate in increments similar to the racks 112b and 112c.

Upon completion of movement of racks 112b and 112c, racks 112d and 112e move leftwardly and the lineal increments of the latter racks are added to the increments of rotation of shafts 166 and 168. Racks 112f and 112g now cycle to add increments of rotation to shafts 166 and 168 respectively.

The levers 150 are controlled to permit the pairs of racks 112b and 112c to move initially followed by movement of racks 112d and 112e and finally 112f and 112g. The movement of racks 112b through 112g is a single cycle of operation.

Racks 112b, 112d, and 112f are controlled by keybanks 42b, 42d, and 42f to accumulate the sum of the keys depressed in these keybanks on shaft 166.

Racks 112c, 112e, and 112g are controlled by keybanks 42c, 42e, and 42g to accumulate twice the sum of the keys depressed in these keybanks on shaft 168.

The differential 194 adds the sums of both shafts 166 and 168 to rotate wiper 202 to a contact 204 representing the singular "unit" digit of these sums. This unit digit's representative contact 204 should be similar in value to the numerical value of the depressed key in keybank 42a. If matching in value, an electrical circuit is completed to permit the key punch 28 to operate. If not matching in value then the punch 28 will not operate and an indicator light, not shown, will illuminate to visually indicate to the operator that an error has been made in depressing the keys in key banks 112b through 112g. Such electrical circuitry is well known to those skilled in the art and need not be described in detail herein.

It will be understood that a fourth lever 150 is provided to permit the balance of the racks 112 to move when a matching modulo nine condition exists.

Since the tape punch 28 is a gang-type punch having sixteen characters on bits of information punched in tape 130 with each punching operation, all of the racks 112 must move at least one increment before the punch operation can occur. Here again, an electrical interlock, not shown, but well known in the art, permits punching when one key in each keybank 42 is depressed and prevents punching if one or more keybanks 42 do not have a numercial value key depressed.

The depressed keys in keybanks 42a through 42g must represent a predetermined code grouping of digits to perform under the modulo nine formula. An example of such a grouping is as follows:

5–123456

Where the first digit "5" represents the code check digit and the balance of the digits represent a previously assigned relationship such as, "style," "catalogue," or other pertinent reference, the formula for establishing the modulo nine with the above digits requires the sum of the first, third, and fifth digit (1 plus 3 plus 5) be added to the sum of twice the second, fourth, and sixth digits (2 plus 4 plus 6) equalling (4 plus 8 plus 2). While twice the last digit (2 times 6 equals 12) is greater than nine, the unit portion of the result is utilized and the tens digit dropped. Therefore, the digits of the group would now appear as (1 plus 4 plus 3 plus 8 plus 5 plus 2 equals 23). The modulo nine factor is divided into the sum (23 divided by 9 equals 2 plus 5 remainder). The remainder "5" equals the check digit "5" in value and therefore proper entry of this code grouping in keybanks 42a through 42g will permit the punch 28 to operate.

An incorrect entry such as a transposition of two adjacent digits will produce a different remainder and prevent the punch 28 from operating. An example of an inadvertent transposition using the same digits as above would be as follows:

5–124356

The check digit "5" is assumed to be correctly entered by depressing key number "5" in key bank 42a. The same formula as above will create the group as (1 plus 4 plus 4 plus 6 plus 5 plus 2 equals 22). The sum "22" divided by nine results in a remainder of "4." This remainder is not the same value as the check digit "5." Therefore, the wiper 202 would be stopped on the contact representative of "4" while the "5" contact 204 would be in the punch controlling circuit. The obvious circuit interruption prevents punch 28 from operating. A review of the keys depressed in keybanks 42d and 42e against the proper entry and correction of the transposition by depressing the release keys in these keybanks and depressing the proper keys will complete the circuit and permit the punch to operate.

Figure 5:
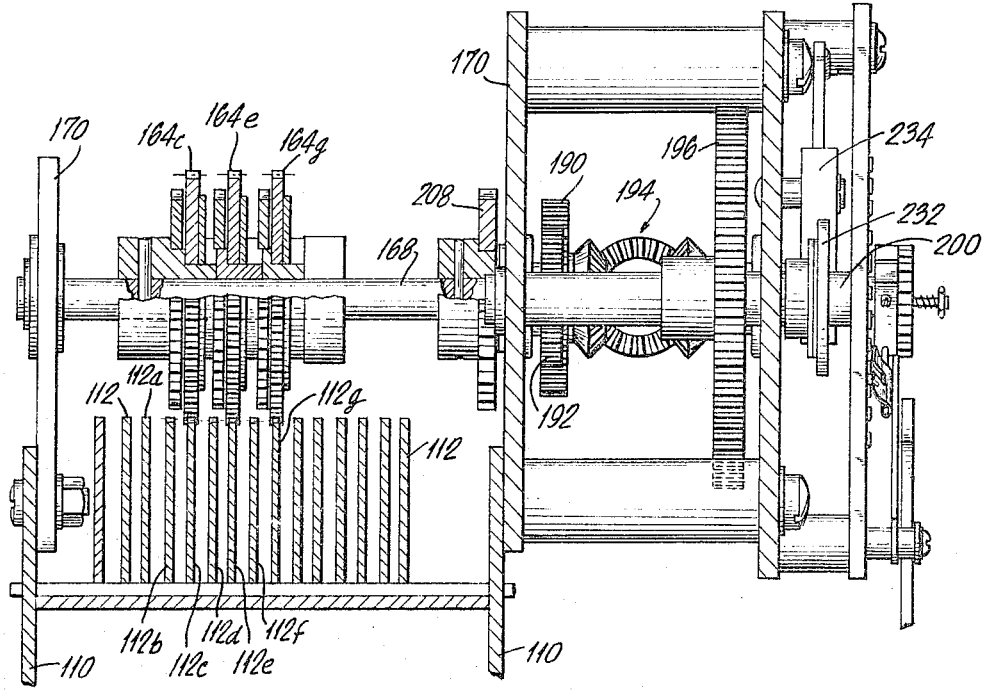
FIGURE 5 is a cross section taken along line 5—5 of FIGURE 4.
Figure 6:
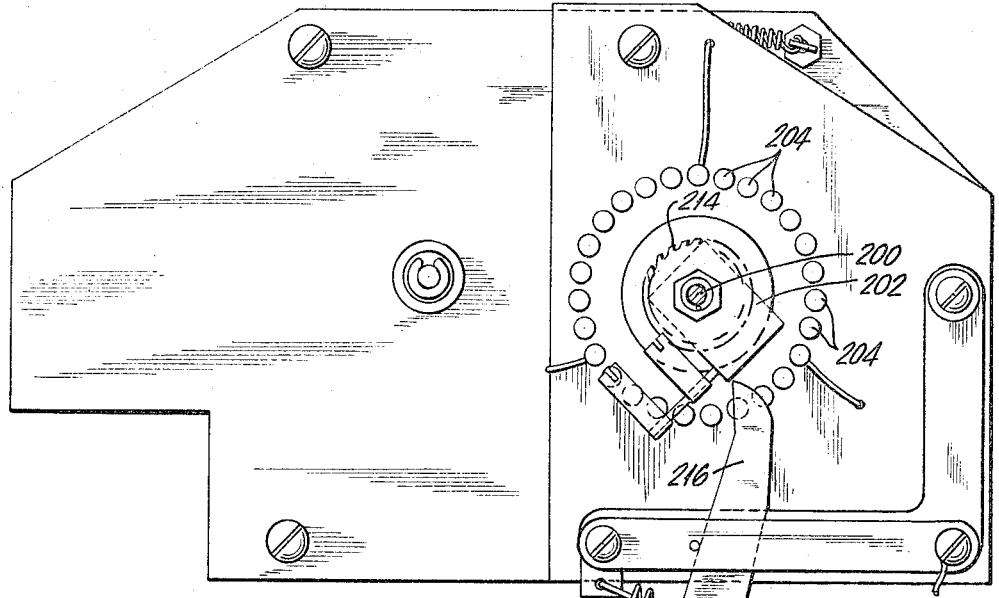
FIGURE 6 is a cross section taken along line 6—6 of FIGURE 4.
Figure 6A:
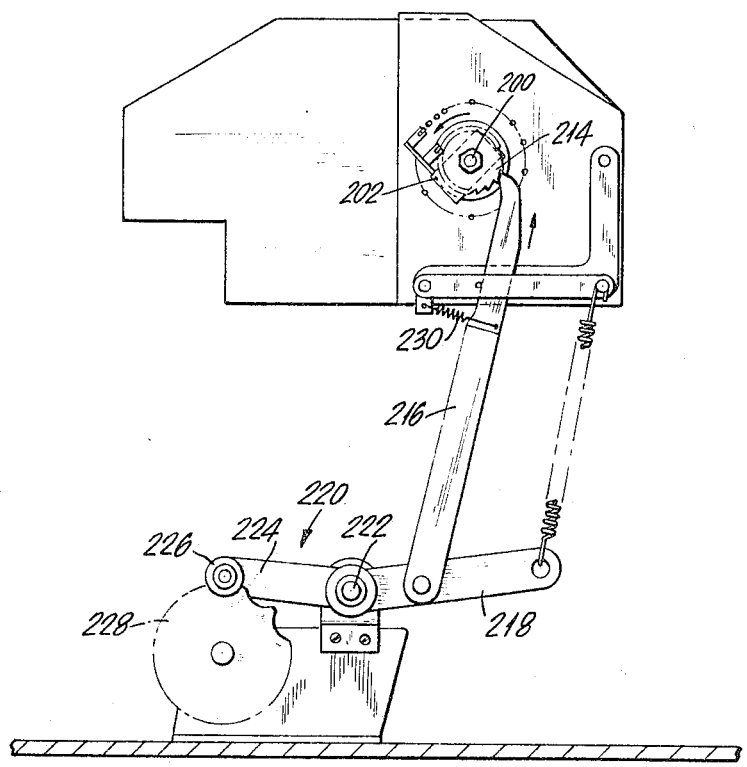
FIGURE 6A is a rear view of the modulo 9 reset mechanism and cam control therefor.

Referring to FIGURES 4, 5, and 6 of the drawings, means is provided to reset wiper 202 to zero position. As was previously described, shaft 200 rotated in one direction only since both input shafts 166 and 168 similarly rotated in but one direction. Thus, wiper 202 must be rotated in the same direction to restore the wiper to zero position in preparation for the subsequent modulo nine operation. Directed toward this end is a ratchet wheel 214 affixed to shaft 200. Adapted to engage ratchet 214 is a reciprocating pawl 216, FIGURE 6A, which is pivotally secured to arm 218 of a bell crank 220. Bell crank 220 is journaled on a fixed stud 222 and has an arm 224 provided with a follower roller 226. Roller 226 rides on the periphery of a cam 228 which rotates by means hereinafter described to move pawl 216 upwardly and downwardly. While moving upwardly, pawl 216 engages ratchet wheel 214 and rotates differential shaft 200 accordingly. Spring 230 maintains pawl 216 in engagement with ratchet wheel 214 as the pawl is raised and permits the pawl to override the teeth of the ratchet as the pawl is lowered. Cam 228 rotates until the zero position is reached by wiper 202. As shown in FIGURE 5, a cam 232 affixed to shaft 200 rotates therewith and controls a microswitch 234 to interrupt the drive means, hereinafter described, which rotates cam 228 when the zero position is reached.

The tape punch 28, FIGURES 1, 2, 15, and 16 is provided with a casting 240 which is affixed to base 22 and disposed to position the punch 28 in a predetermined, aligned, operating relationship with decoding rack assembly 26. The casting 240 is formed with a base portion 242 and an upper portion 244. The upper portion 244 forms a pair of spaced angularly projecting support frame side members 244a and 244b between which the code wheels 128 are journaled on a shaft 248. Pinions 126, which are secured to the respective code wheels 128, are disposed in meshing engagement with serrations 124 of racks 112. Thus, linear movement of racks 112 rotate pinions 126 and code wheels 128 to present differing code sections 128a in operative relationship with punch pins 246 of tape punch 28. The sixteen rows of punch pins 246 are slidably mounted in an upper die 250. Cooperable with upper dies 250 is the lower complemental die 252. Die 250 consists of spaced plates 254 and 256 having matching apertures in which the punch pins 246 reside. The paper tape 130 is disposed between the die plate 254 of die 250 and a die plate 258 of lower die 252.

Disposed transversely of each row of punch pins is a fixed plate 260 that is secured at one end to casting 242 and at the other end to a plate 262 affixed to upper casting portions 244a and 244b. Plates 260 cooperate with recesses 246a in pins 246 to withdraw pins 246 from perforations made in tape 130, as will be hereinafter apparent.

A lever 264, journaled on a shaft 266 mounted on casting 242, is bifurcated to provide spaced arms 264a and 264b. Said arms are provided with slots 268 which are adapted to receive a shaft 270 therein. Shaft 270 is mounted on lower die assembly 252.

Lever 264 is further provided with a follower roller 272 which rides on the periphery of a cam 274 affixed to a rotatable shaft 276. The means to rotate shaft 276 will be hereinafter described.

Rotation of cam 274 pivots lever 264 on shaft 266 and raises die 252 and die 250. The imperforate tape 130 engages the punch pins 246 and moves the pins upwardly. Those pins that enter code slots 128b in the code section 128a of code wheel 128 continue to use and enter the slots 128b. Those pins which do not enter slots 128b but rather engage the periphery of section 128a of code wheels 128 are arrested and the tape 130 is perforated by the arrested pins.

The downward movement of die 250, 252 moves the pins 246 downwardly away from code wheels 128 until the recesses 246a in pins engage plates 260. The die 250, 252 continues to move downwardly with paper tape 130 and separates the perforated tape from those pins 246 which entered and perforated the tape 130.

The tape 130 is now moved away from tape punch 28 by the tape feed mechanism described in the co-pending application S.N. 285,773.

Means are provided to align all of the code wheels 128 in correct aligned relation with the sensing pins 246 and directed toward this end is a pivotal plate 280, FIGURE 3, which acts as a common detent for the code wheels. A cam 282 affixed to shaft 276 has a follower 284 disposed to engage the periphery of cam 282. Follower 284 is rotatably mounted on lever 286 which is pivotally mounted on a stud 288 secured by a bracket 290 to base 22. Pivotally secured to lever 286 is one end of a link 292 which is pivotally secured at the other end to a rocker arm 294. Rocker arm 294 pivots on a centrally disposed stud 296 affixed to a side plate 110 of code rack assembly 26. A second rocker arm 294, not shown, is similarly attached to the other side plate 110.

Detent plate 280 is affixed to the rocker arms 294 and when cam 282 rotates rocker arms 294 through lever 286 and link 292 moves into engagement with notches 128c in code wheels 128 and aligns all of the plurality of code wheels 128 into accurate registration with the punch pins 246. Obviously, plate 280 aligns the code wheels 128 during the portion of the cycle of the source recorder immediately prior to the tape punching operation.

The paper tape supply 34 and the paper tape take-up storage 36 combine to provide a tape transport system, FIGURES 1 and 10, that supplies the paper tape to the tape punch 28. The means for moving the paper tape is completely described in the aforementiontd co-pending tape feed application and need not be described in detail herein. Briefly, the tape feed means draws the imperforate tape from the supply reel 300 past a guide 302, around a weighted tape sensing roller 304 through the tape punch 28 onto the take up reel 306 of the tape storage 36.

The no-tape, tight-tape, or broken-tape roller 304 is mounted on a weighted arm 308 that is pivotally mounted on a stud 309 affixed to bracket 310 secured to base 22. Arm 308 carries a counter balance 312 that co-acts with a pair of contacts 314 to control the punch when arm 308 pivots on stud 309 as a result of paper tape 130 not supporting roller 304 in the position shown in FIG- URE 17. Counter clockwise rotation of arm 308 will result from a tight tape 130, such as might occur if reel 300 fails to rotate freely thus affecting contacts 314. Analogously, a broken-tape or loose-tape condition will permit arm 308 to rotate clockwise and affect contacts 314 to control the tape punch actuating circuit, not shown, but well known to those skilled in the art.

The tape storage reel 306 is rotated through a drive belt 321 by means of a pulley 316 affixed to shaft 276, a pair of guide idler pulleys 318 and 320 mounted on side frame 106, and a pulley 322 rotatably mounted on a stud 324. Tape storage reel 306 is adapted to rotate with pulley 322.

Thus, each punching cycle rotation of shaft 276 similarly rotates the storage reel 306 to wind up the punched tape 130 for subsequent removal as desired.

While there has been shown and described the manually controlled input means for producing a codally perforated paper tape, a secondary record of the codal perforations is produced as a by-product of the tape punching operations. Directed toward this end is the printer 30 which produces a printed record of the numerical equivalent of the codal data punched in paper tape 130.

As shown in FIGURES 2, 3, 18, 19, and 20 of the drawings printer 30 comprises a pair of spaced side frames 330, 332 affixed respectively to the side frame plates 110 of code rack decoding assembly 26.

Disposed between the side frames 330, 332 is the printing paper medium 334, the paper advancing and printing platen mechanism 336 and the printing type means 338.

Printing type means 338 comprises a bar extension 340 affixed to each code rack 112 and linearly movable therewith with each code wheel 128 set-up operation. Mounted on the lower margin of each bar extension 340 is raised indicia type 342. Indicia type 342 is disposed in numerical arrangement consistent with the radial disposition of the code equivalents 128a on code wheels 128. Thus, the positioning of a particular code section 128a on a code wheel 128 by the depression of the related numerical key in the related key bank 42, similarly sets the same numerical representation on the related bar extension 340 on a printing line whereby the platen mechanism 336 makes a printed record of the numerical representation of the type 342 on bar 340.

The platen and paper advancing mechanism 336 is conventional in that platen 344 raises printing paper tape 346 against an inked ribbon 348 and against the now stationary type segments 342 of the bar extensions 340 on all racks 112 to effect a reproduction of the engaged type segments on paper 346.

Paper advancing mechanism 336 comprises a platen 344 around which paper 346 is disposed. Platen 344 and the ribbon reversing mechanism 350 are mounted on a pair of links 352 pivotally attached to arms 354 affixed to square shaft 356. Shaft 356, while shaped square between the side frames 330 and 332 terminates at both ends in circular relation in bearing means in the side frames. An arm 358 affixed to shaft 356 is connected to a link 360 that is controlled by a follower and cam, not shown, but rotated by shaft 276. As hereinbefore described, shaft 276 controlled the punch 28 to perforate tape 130. Thus, printing of paper 346 occurs at the same time punch 28 perforates tape 130.

Ribbon reversing mechanism 350 is the conventional ratchet-pawl type wherein low ribbon on one spool effects a transfer of the ribbon advancing mechanism to re-wind the ribbon 348 on the low spool. Such reversing mechanisms are well known to those skilled in the art and need not be described in detail herein. It is sufficient to state that with each printing operation ribbon 348 rotates directionally on the spools to provide a continuously changing inked ribbon at the print line for the succeeding printing operations.

The motive means for the Data Source Recorder generally comprises the electric motor drive 38 that powers the shafts 145 and 276. Shaft 145 is coupled to the motor drive 38 through an electromagnetically operated clutch 370 which permits one complete revolution of shaft 145 with each energization of electro-magnet 372. As shown in FIGURES 1 and 2, the motor 38 through belt 38a rotates pulley 374 continuously while power is applied to the motor. Pulley 374 is affixed to an idler shaft 376 that is journaled in a suitably mounted bearing 378. Also affixed to idler shaft 376 is a pinion 380 which is disposed in meshing engagement with a gear 382 which is mounted for rotation with a sleeve 384 journaled on shaft 276. A pinion 386 affixed to sleeve 384 rotates therewith and meshes with an idler gear 388 rotatably mounted on a stud shaft 390. Idler gear 388 meshes with a gear 392 which is secured to a sleeve 394 journaled on shaft 145. A conventional one-revolution clutch 370 couples sleeve 394 to shaft 145 and rotates shaft 145 one revolution. As previously set forth, shaft 145, in effect, permits the code racks 112 in decoding rack assembly 26 to sense the depressed keys in key banks 42 and concurrently set the code wheels 128, position the print bars 340 and activate the modulo nine mechanism 32. As hereinbefore described, the matching of the value of the check digit depressed in key bank 42a with the value of the contact 204 on which the wiper 202 is positioned permits an electric circuit to be completed and therefore an electromagnet 396 is energized. Electromagnet 396 controls a conventional one-revolution clutch 398 which couples sleeve 384 to shaft 276. Thus, when the modulo nine mechanism checks with the depressed code digit key, then shaft 276 is permitted to rotate one complete revolution. Shaft 276, as previously described, actuates the tape punch 20, the tape feed 40, the printer 30 and the bail, which releases all depressed keys in keybanks 42 and restores racks 112 and code wheels 128 in preparation for a subsequent entry of data in the keyboard 24.

In actual use of the Data Source Recorder, an operator actuates a switch, not shown, which applies electricity to motor 38. The operator then visually reads the coded numerical representations imprinted on a garment ticket and depresses the corresponding keys in key banks 42. It may be stated that prior to depressing any key in key banks 42, a "type of transaction" key in key bank 41 is depressed and locked in depressed condition. The keybank locking means hereinbefore described effectively prevents the release of a depressed "type" key in key bank 41 once the key has been depressed and the lock actuated. Thus, the operator may ignore key bank 41 while entering data repetitively of the same "type of transaction."

Where the data to be entered is less than the number of digits required to depress one key in all key banks 42 then the zero keys in the balance of the key banks 42 are depressed.

The operator now depresses the "start" key 400 which momentarily energizes the electromagnet 372 associated with the clutch 370 on shaft 145. Assuming the proper keys were depressed with respect to the modulo nine key banks 42a through 42g, then shaft 276 will be released to perforate the tape 130. Should an error or mistake have been made in the entries in the modulo nine key banks, the shaft 276 will not be released and a suitable alarm or indicator actuated. This will alert the operator to the fact that an error exists in the key banks 42a through 42g. A visual re-check of the depressed keys on the key bank indicators along with the comparison of the printed information on the garment ticket will readily disclose the error. Release of the key banks containing the error by means of the individual key bank error release keys and depressing of the proper keys is required before once more actuating the "start" key. The second cycle of shaft 145 and a correct correlation between the modulo nine check information and keyboard entered data permits the shaft 276 to rotate and punch the keyboard data in codal perforations in the tape 130. The completion of a correct punching operation negates or eliminates the previously displayed "error" indication.

It will be understood that the modulo nine check of keyboard entered data need not necessarily be used with every type of entry. Certain of the keys in "type of transaction" keybank 41 may be utilized to by-pass the modulo nine and cause the data represented by the depressed keys in the keyboard to be codally perforated in the tape 130. Of course, the code wheel 128 controlled by the keybank 41 will set up the punch to perforate the message or punched data with codal designations of the type of transaction. For example, when the Source Recorder is utilized by a retail establishment in a chain of stores to prepare tapes for subsequent processing at a central headquarters, then it may be desirable to enter the total cash transactions at the end of the day's selling operations. Obviously, the amount of cash will vary from day to day. Therefore, a pre-established modulo nine check system would not be employed in entering this variable information in the keyboard.

As previously set forth, the printer 30 records a printed record of every punching operation. Therefore, the entry of data not controlled by the modulo nine check mechanism can be verified by visual reference to the printed tape. The mechanical interconnecting of the perforated or punched tape producing code wheels and the type that produces the printed record positively prevents the erroneous printing of data differing from that perforated by the punch.

Thus, there has been shown and described a Source Recorder having a plurality of components that individually and collectively combine to provide a keyboard-operated tape punch which possesses novelty and which is well adapted to meet the conditions of practical use.

It will be understood that while a single embodiment of the Source Recorder and the components therein has been shown and described, changes and modifications could be made thereto without departing from the scope of the invention as set forth in the following claims.

The invention claimed is:

1. A machine for punching a paper tape with codal information comprising a keyboard having plural key banks, each of said key banks having plural manually selectable and depressible keys, a tape punch having plural punch pins, mechanical means interconnecting the keys in said key banks with said tape punch to selectively control the punch pins in direct relation with the selected manually depressed keys, and a modulo nine check mechanism connected to said mechanical interconnecting means to selectively control the tape punch in accordance with the selection accuracy of the depressed keys in said key banks.

2. A machine for manually entering information in a key board to control a tape punch to punch codal data in a paper tape corresponding to the information manually entered in the key board, including mechanical means interconnecting the keys in a key board with the tape punch, means to actuate the tape punch to punch a paper tape with codal data corresponding to the information entered in the keyboard, and a modulo nine check means for selectively controlling the tape punch actuating means in accordance with the manual entering accuracy of the information entered in said keyboard.

3. In a machine of the class described, a keyboard having plural key banks of individually depressible keys, a modulo nine check mechanism operatively associated with said key banks, said check mechanism comprising a pair of incrementally rotatable shafts, means connecting one of said shafts to a selected plurality of said key banks to rotate said shaft in one-to-one ratio increments corresponding to the digit value of the keys depressed in the selected plurality of key banks, means connecting the other of said shafts to a different plurality of said key banks to rotate said second shaft in one-to-one ratio increments, differential means connected to said shafts having a single output shaft, and means controlled by said output shaft to indicate a digital value equal to a predetermined check digit.

4. In a machine of the class described, a keyboard having plural key banks of individually depressible keys, a modulo nine check mechanism operatively associated with said key banks, said check mechanism comprising a pair of incrementally rotatable shafts, means connecting one of said shafts to a selected plurality of said key banks to rotate said shaft in one-to-one ratio increments corresponding to the digit value of the keys depressed in the selected plurality of key banks, means connecting the other of said shafts to a different plurality of said key banks to rotate said second shaft in one-to-one ratio increments, differential means connected to said shafts having a single output shaft, means controlled by said output shaft to indicate a digital value equal to a predetermined check digit, said indicating means comprising a rotatable contact adapted to incrementally rotate and engage fixed contacts with each increment of rotation, a check digit keybank having plural depressible keys and electric circuit means electrically connecting the respecting check digit keys with said fixed contacts whereby the engagement of the rotatable contact with a fixed contact of equal digital value provides the modulo nine check.

5. The combination of a plurality of groups of keybanks and each keybank having individually depressible keys of differing digital value, with a modulo nine check digit mechanism, comprising a differential unit having a pair of input shafts and an output shaft, one of said output shafts being associated with a first group of said plurality of keybanks to accumulate incrementally the digital values of the keys depressed in the associated keybanks, the other of said input shafts being associated with a second group of said keybanks to incrementally rotate twice the digital value of the keys depressed in the second group of said keybanks, and said output shaft being incrementally rotatable in accordance with the incremental rotation of said input shafts to a degree of rotation predetermined to equal the digital value of a predetermined check digit.

6. In a machine having a manually operable keyboard comprising a plurality of keybanks, a tape punch, means interconnecting the keybanks to control means for the tape punch, means to actuate said interconnecting means including a one revolution clutch, means to actuate said tape punch including a one revolution clutch, common drive means for rotating both of said clutches, a modulo nine check means, manually operated means to release said first clutch to rotate one revolution, and means responsive to the modulo nine check means to release said second clutch to rotate one revolution and actuate said tape punch actuating means.

7. In a machine of the class described, a plurality of independently linearly movable decoding racks, plural means to move groups of said racks in one direction in a predetermined sequence, means actuatable to individually arrest the linear movement of said racks in said direction, a plurality of keybanks, and means controlled by the depression of keys in said keybanks to actuate said rack arresting means, and said arresting means comprising a plurality of rack sensing bars adapted to be raised by the key controlled means to engage one of a plurality of steps in each rack and arrest the linear movement of the rack in a predetermined position directly proportional to the depressed key in the keybank.

8. In a machine of the class described, a plurality of independently linearly movable decoding racks, plural means to move groups of said racks in one direction in a predetermined sequence, means actuatable to individually arrest the linear movement of said racks in said direction, a plurality of keybanks, and means controlled by the depression of keys in said keybanks to actuate said rack arresting means, and said arresting means comprising a plurality of rack sensing bars adapted to be raised by the key controlled means to engage one of a plurality of steps in each rack and arrest the linear movement of the rack in a predetermined position directly proportional to the depressed key in the keybank, a tape punch having code wheels for selectively setting the tape punch to perforate codal patterns in a tape corresponding to a selected codal pattern on the code wheel, and means connecting each of said code wheels to a respective code rack to rotate said code wheels in direct relation to the depressed keys.

References Cited by the Examiner

UNITED STATES PATENTS

| 2,064,340 | 12/1936 | Davis | 234—36 X |
| 2,082,155 | 6/1937 | Errera. | |
| 2,324,280 | 7/1943 | Colman | 234—37 X |
| 2,943,787 | 7/1960 | Cartwright | 234—34 X |
| 3,124,302 | 3/1964 | Arnett et al. | 234—99 X |

FOREIGN PATENTS 935,020   8/1963   Great Britain.

WILLIAM S. LAWSON, *Primary Examiner.*